Jan. 26, 1937.  J. G. CLEVELAND  2,069,029
ECONOMIZING MOTOR FUEL APPARATUS
Original Filed April 21, 1934  2 Sheets-Sheet 1
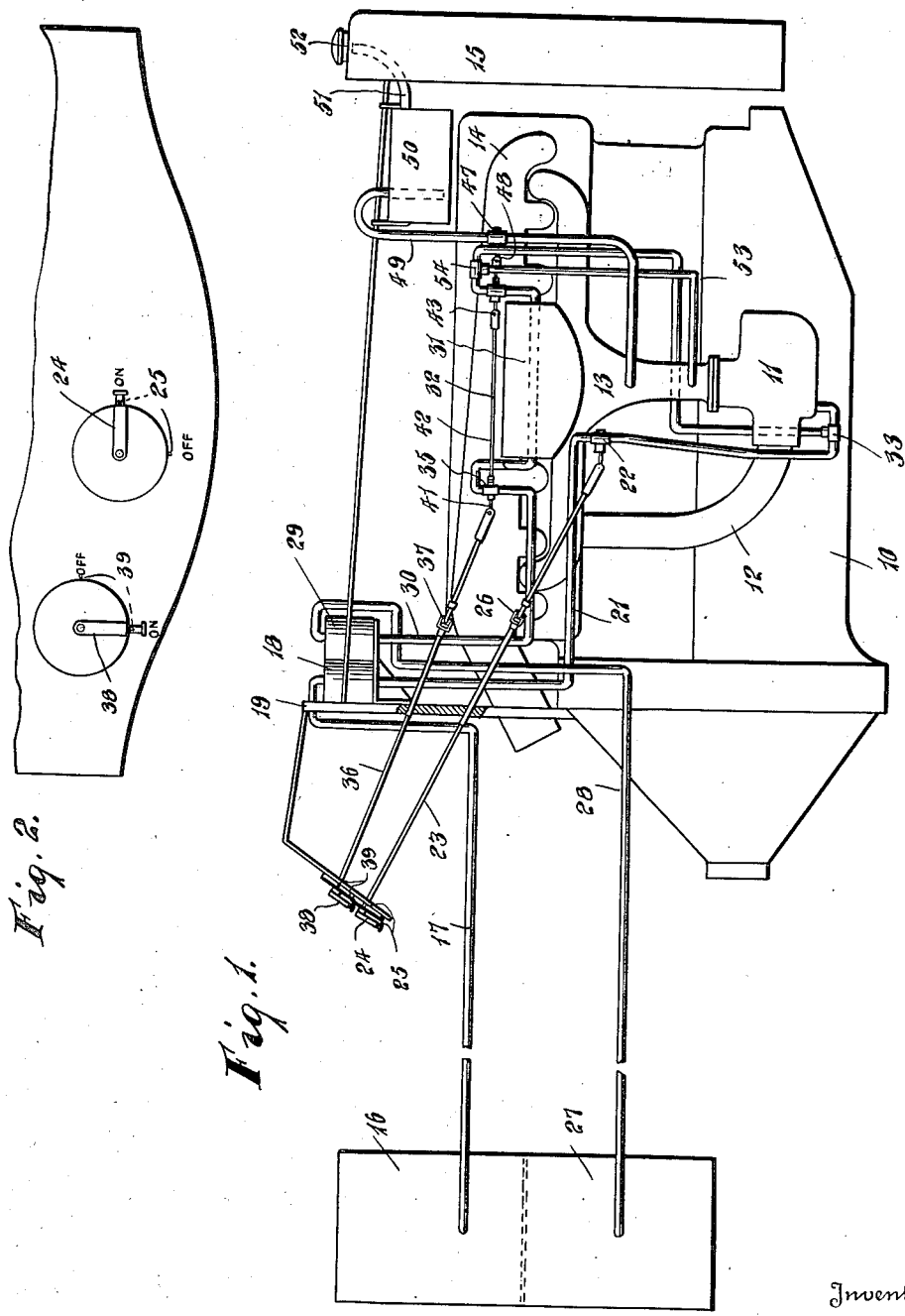
Inventor
James G. Cleveland.
By L. F. Randolph Jr.
Attorney Jan. 26, 1937.  J. G. CLEVELAND  2,069,029
ECONOMIZING MOTOR FUEL APPARATUS
Original Filed April 21, 1934  2 Sheets-Sheet 2

Inventor
James G. Cleveland,
By L. F. Randolph Jr.
Attorney

Patented Jan. 26, 1937

2,069,029

UNITED STATES PATENT OFFICE 2,069,029

ECONOMIZING MOTOR FUEL APPARATUS

James G. Cleveland, Enid, Okla.

Application April 21, 1934, Serial No. 721,832
Renewed November 19, 1936

4 Claims. (Cl. 123—127)

This invention relates to an economizing motor fuel apparatus.

It primarily aims to provide means whereby an internal combustion engine used for propelling automobiles, vessels or the like, may selectively use fuel of different grades, in view of their difference in type, using the better grades when starting and during the period required for the engine to acquire the proper heat for use of the second grade, parts being operable for shifting from the use of one grade to the use of the other grade at any time and without stopping the engine.

Another object is to provide a novel construction wherein heated fuel of the lower grade will be removed from the zone where there is danger of explosion, following shifting to the use of the higher grade fuel.

A further object is to provide a novel means whereby water may be drawn to the intake manifold in the form of a spray to dampen the mixture, keep down the production of carbon and cool the motor.

The more specific objects and advantages will become apparent from a consideration of the description following taken in connection with accompanying drawings illustrating an operative embodiment.

Figure 3:
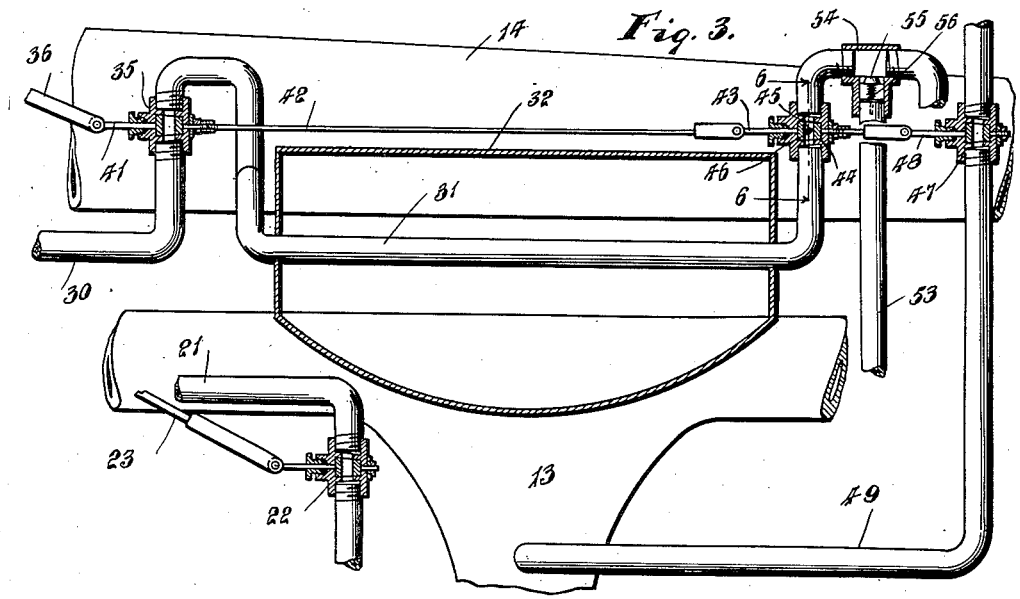
Figure 4:
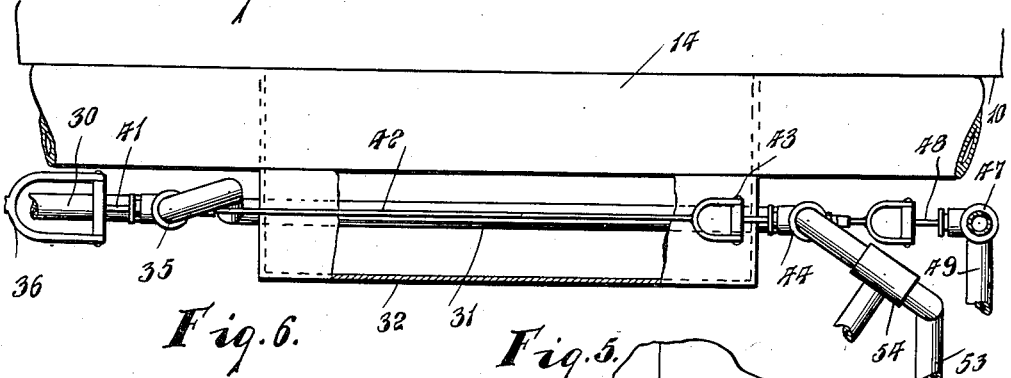
Figure 6:
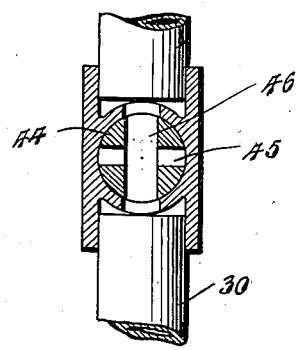
Figure 5:
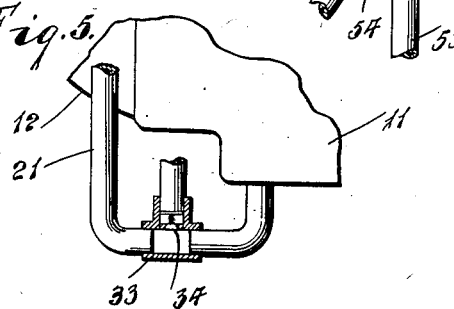

In said drawings:

Figure 1 is a view in side elevation, showing the invention applied to an internal combustion engine of the automobile-propelling type, Figure 2 is an elevation of the instrument board of the automobile in connection with which said engine is used, Figure 3 is an enlarged longitudinal sectional view primarily showing the heater and valves in section, Figure 4 is a plan view particularly showing the valves and their operating mechanism, Figure 5 is a detail of the check valve presenting the drawing of low cost fuel into the higher cost fuel supply line, and Figure 6 is a detail section taken on the line 6—6 of Figure 3.

Referring specifically to the drawings, 10 designates a conventional internal combustion engine such as is used to propel an automobile, boat or the like. Said engine has associated therewith, among other conventional parts, a carburetor 11, air intake pipes 12 for said carburetor, an inlet manifold 13, an exhaust manifold 14, a radiator 15 for the water cooling system of said internal combustion engine.

Gasoline or blended fuel of the usual type is adapted to be stored in a tank 16 carried by the vehicle and drawn from said tank 16 through a conduit 17 into a vacuum tank 18 supported for instance on the front of the instrument board 19 of the vehicle. From vacuum tank 18, said fuel is adapted to pass through a pipe or conduit 21 to the carburetor, under control of a suitable cut-off valve 22, operable through the turning of a rod 23 journaled in the dash board 19 and having an operating crank or handle 24 movable to and from the on and off position as indicated in Figure 2, and having conventional means 25 to lock the same in either of said positions or an intermediate position. Universal joint 26 is provided in the length of the rod 23.

In addition to the tank 16, the vehicle carries another storage tank 27 which may be located adjacent thereto. The tank 27 is adapted to hold a lower grade of fuel than the tank 16, so that at advantageous times, the engine may be run on the lower grade of fuel and hence at considerably less expense. From this tank 27, a pipe or conduit 28 leads to a vacuum tank 29. From the vacuum tank 29, which is located preferably adjacent the vacuum tank 18, a pipe or conduit 30 leads for a portion of its length at 31 being within an enclosure or heater 32 surrounding a portion of the exhaust manifold 14. Terminally, the pipe 30 extends to and is connected with the pipe or conduit 21 at a fitting 33. As best shown in Figure 5, a downwardly opening check valve 34 is disposed, to prevent fuel supplied through pipe 21 rising into the pipe 31, but permitting effective flow or passage of the fuel of the lower grade, through pipe 30 into the pipe 21, to enter the carburetor 11.

In the pipe 30, in the rear of the heater 32, a cut-off plug valve 35 is rotatably mounted with which an operating rod 36 is connected, such rod having a universal joint 37 in its length. Rod 36 is journaled in the instrument board 19 and has a handle or crank 38 movable to and from the on and off position and adapted to be locked in either position or an intermediate position by conventional means 39. Instead of being located on the instrument board, the control members 24 and 38 may obviously be mounted at any other desired location. Valve 35 has its stem 41 attached to a rocker rod 42, to which the rod 36 is connected. Rocker rod 42 also has a stem 43 of a rotatable plug valve 44 connected thereto, so that when the valve 35 is in closed position, a restricted port 45 through the plug valve 44 will be opened, while when the valve 35 is opened, a large port 46 of the plug valve 44 will also be opened, it being realized that the valve 35 and 44 operate in unison. Further operating simultaneously with said valve 35 and 44 is a cut-off valve of the plug type, 47, which is cut-off when the valve 35 is closed and which is opened when the valve 35 is opened, such plug having a stem 48 connected to the rocker frame 42.

Said valve 47 is located in a water supply pipe 49 communicating with the interior of the intake manifold 13 and also communicating with a source of water which may be a tank 50 connected to the automobile as shown, and being capable of filling simultaneously with radiator 15, or otherwise, since a filling tube 51 extends into the radiator and terminates at the filling opening 52 thereof. The suction in the engine, will draw water from the tank 50 into the intake manifold, when the valve 47 is open.

Leading from the pipe 30 beyond the heater 32 is a safety pipe or branch 53 which may communicate with the intake manifold 13, as shown, the air tube 12 or the like, and at the fitting 54 connecting it to the pipe 30, a normally closed valve 55 is disposed, such valve being closed by the tension of a spring 56 and adapted to be opened by the suction of the engine, when valve 55 is closed.

Attention is directed to the fact that the valve 44 functions first as a safety valve. In case the check valve 34, for any reason, fails to work, it would be impossible for gasoline or fuel to back up into pipe 31 with the probability of a serious explosion. This valve 44 functions secondly as a relief valve to let the heated fuel escape into the carburetor when closed, through the by-pass into the carburetor manifold. Due to the vacuum pull of the motor, all of the heated fuel in pipe 31 is gradually sucked out into the intake manifold 13 and then into the combustion mixture chamber of the motor. Without the valve 44 having a by-pass, the heated fuel would be locked in pipe 31, causing serious danger of an explosion of expanding fuel therein. Because passage 45 is of less diameter than the passage 46, the escape of the fuel in advance of valve 34 when the latter is closed, will be more gradual than if it passed through the wider passage 46 or merely the bore of the pipe 31, which causes more gradual admixture of that fuel with the fuel in the intake manifold.

In starting operation of the engine, the valve 35 is closed and the valve 22 is open, and hence ordinary fuel passes through the carburetor into the engine and operates the same. When the engine has acquired the necessary temperature valve 22 is closed and valve 35 is opened. The better grade of fuel is accordingly cut off and the lower grade of fuel passes through the pipe 30 particularly section 31, being efficiently heated, more thoroughly cracked and gasified therein and passing through larger port 46 and finally discharging into the fitting 33 and being drawn into the carburetor.

In shifting back to the better grade of fuel, as may be necessary in heavy traffic, and in completely shutting off the fuel supply to the engine, a quantity of fuel with consequent danger will remain particularly in the pipe 31 or forwardly of the closed valve 35. To this end, when the valve 35 is closed, the restricted passage 45 is still open so that the engine may suck in all fuel of the lower grade from the pipe 31 in advance of the valve 35, in restricted quantities, to better preserve the balance of the fuel. After such lower grade fuel is sucked by the engine past the valve 44 it is also sucked past the valve 55, passing through pipe 53 and into the intake manifold.

Various changes may be resorted to provided they fall within the spirit and scope of the invention.

I claim as my invention:—

1. In combination with an internal combustion engine, a conduit for the passage of fuel to a carburetor thereof, a cut-off valve for said conduit, a conduit for the passage of a different grade of fuel to said carburetor, a cut-off valve for the second mentioned conduit, said conduits communicating adjacent the carburetor, a check valve in one of said conduits preventing the fuel in the other from entering, and means including a valve operable by the first mentioned cut-off valve whereby fuel will be drawn from the first mentioned conduit by the suction of the engine in advance of the first mentioned cut-off valve when the latter is closed.

2. In combination with an internal combustion engine, a conduit for the passage of fuel to a carburetor thereof, a cut-off valve for said conduit, a conduit for the passage of a different grade of fuel to said carburetor, a cut-off valve for the second mentioned conduit, said conduits communicating adjacent the carburetor, a check valve in one of said conduits preventing the fuel in the other from entering, means including a valve operable by the first-mentioned cut-off valve whereby fuel will be drawn from the first mentioned conduit by the suction of the engine in advance of the first mentioned cut-off valve when the latter is closed, and means for the supply of water to the intake manifold of the engine having a cut-off valve operable simultaneously with the second mentioned cut-off valve.

3. In combination with an internal combustion engine, a conduit to supply fuel to the carburetor having a part adjacent the exhaust manifold for heating purposes, a cut-off valve for said conduit, a valve operable in said conduit by said cut-off valve having a passage open when said cut-off valve is open and a passage more restricted than said passage open when the cut-off valve is closed, means to supply fuel to the carburetor when said cut-off valve is closed, said conduit including a pipe subject to the suction of the engine and having a valve therein adapted to open under the suction of the engine.

4. The combination according to claim 1 wherein the fourth mentioned valve has intersecting passages extending completely therethrough, one of said intersecting passages being more restricted than the other intersecting passage.

JAMES G. CLEVELAND.